United States Patent [19]

Aoki et al.

[11] Patent Number: 5,069,815
[45] Date of Patent: Dec. 3, 1991

[54] POWDER ELECTROLUMINESCENT ELEMENT COMPRISING INORGANIC ELECTROLUMINESCENT PARTICLES AND A POLYURETHANE BINDER

[75] Inventors: Akira Aoki; Yukio Fujishima, both of Sakai; Yusuke Makio, Takatsuki; Susumu Kusakawa, Yokkaichi; Sadaaki Tsuji, Yokkaichi; Tadashi Okamura, Mie, all of Japan

[73] Assignees: Osaka-Fu, Osaka; Itoh Seiyu Kabushiki Kaisha, Yokkaichi, both of Japan

[21] Appl. No.: 444,226

[22] Filed: Dec. 1, 1989

[30] Foreign Application Priority Data

Dec. 3, 1988 [JP] Japan ................................ 63-306740

[51] Int. Cl.$^5$ ............................................. C09K 11/02
[52] U.S. Cl. .................................................. 252/301.36
[58] Field of Search ...................................... 252/301.36

[56] References Cited

U.S. PATENT DOCUMENTS

| 3,214,622 | 10/1965 | D'errico et al. | 252/301.36 |
| 3,227,656 | 1/1966 | Jeffreys | 252/301.36 |
| 3,306,770 | 2/1967 | Klug et al. | 252/301.36 |
| 4,107,070 | 8/1978 | Everts et al. | 252/301.45 |
| 4,508,760 | 4/1985 | Olson et al. | 252/301.6 S |

FOREIGN PATENT DOCUMENTS

| 59-151799 | 8/1984 | Japan . | |
| 2043673 | 10/1980 | United Kingdom | 252/301.36 |

Primary Examiner—Prince Willis, Jr.
Assistant Examiner—Jerry D. Johnson
Attorney, Agent, or Firm—Armstrong, Nikaido, Marmelstein, Kubovcik & Murray

[57] ABSTRACT

A powder electroluminescent element which comprises electroluminescent particles and an organic binder at least partly comprising a polyurethane shows a high emission intensity or brightness and has a prolonged operating life.

2 Claims, 2 Drawing Sheets

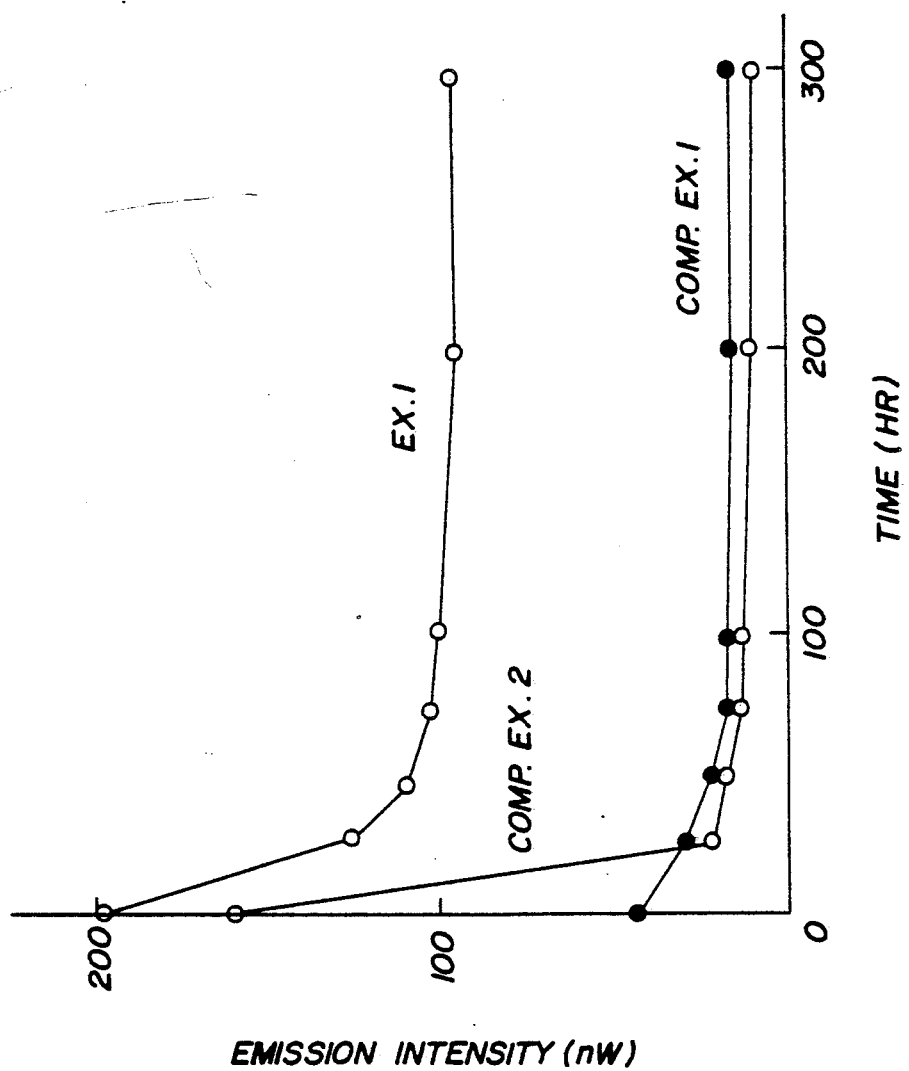

POWDER ELECTROLUMINESCENT ELEMENT COMPRISING INORGANIC ELECTROLUMINESCENT PARTICLES AND A POLYURETHANE BINDER

FIELD OF THE INVENTION

This invention relates to a powder EL (electroluminescent) element improved in light emission intensity (or brightness) and in operating life.

BACKGROUND OF THE INVENTION

A light-emitting device comprising two electrodes at least one of which is transparent and a light-emitting layer comprising a luminescent material disposed between the electrodes is called "EL device". The field of use of EL devices is expanding and, currently, they are used in displays of computers and word processors, in annoucement or information boards, in airfield displays and in backlights for automobile gauge panels and the like, among others.

In particular, powder EL elements, which are essential to EL devices and comprise a luminescent material distributed within an organic binder to serve as a dispersion medium and as a dielectric, have advantages in that they are inexpensive and lightweight and that they have a high degree of freedom in shape and form. Future expansion of the field of their application is therefore anticipated.

In powder EL elements, such luminescent materials as zinc sulfide, selenium sulfite, zinc sulfide-selenium sulfide (mixed crystal), calcium sulfide and strontium sulfide are used in the form of luminescent particles, with one or more activators, such as copper, silver, aluminum, manganese, rare earth elements and halogens, added to such base materials as required.

Used as the organic binder are macromolecules having a high dielectric constant, such as the ones listed below:

Japanese Laid-open Patent Application Kokai No. 62482/1980: Cyanoethylcellulose;

Japanese Laid-open Patent Application Kokai No. 111987/1980: Polyimide resins (cyanoethylated polyvinyl alcohol and cyanoethylated saccharose being also mentioned referring to the prior art);

Japanese Laid-open Patent Application Kokai No. 63795/1981: Fluororesins to be used in the molten state, for example polyvinylidene fluoride resins such as polyvinylidene fluoride, trifluoroethylene-vinylidene fluoride copolymer and tetrafluoroethylene-vinylidene fluoride copolymer (mention being made, referring to the prior art, also of epoxy resins, cyanoethyl-cellulose and fluororesins);

Japanese Laid-open Patent Application Kokai No. 189496/1982: Cyanoethylcellulose (mention being made of epoxy resins as the prior art);

Japanese Laid-open Patent Application Kokai No. 151799/1984; Cyanoethylated polysaccharide-glycerol condensates, cyanoethylated polysaccharides and the like, more specifically cyanoethylated glycerol-pullulan condensate, cyanoethylated glycerol-hydroxyethylcellulose condensate, cyanoethylated glycerol-soluble starch condensate, cyanoethylated glycerol-sucrose condensate, cyanoethylated glycerol-polyvinyl alcohol condensate, cyanoethylated sucrose, etc.; fluororesins, such as vinylidene fluoride-hexafluoropropylene copolymer, vinylidene fluoride-tetrafluoroethylene-hexafluoropropylene terpolymer, polytetrafluoroethylene, polychlorotrifluoroethylene, etc.;

Japanese Laid-open Patent Application Kokai No. 81798/1985: Combination of ethylcellulose and terpineol;

Japanese Laid-open Patent Application Kokai No. 211898/1987: Acrylic paints;

Japanese Laid-open Patent Application Kokai No. 234895/1987: Acrylic paints.

Among those mentioned above, epoxy resins and cyanoethylation products have been put to practical use.

However, while future expansion of the fields of application is expected, currently available EL elements are unsatisfactory in brightness or light emission intensity.

Brightness is a function of the voltage and the dielectric constant of the binder (dispersion medium). When the voltage is increased, the brightness also increases. From a practical viewpoint, the voltage to be applied should be not higher than 200 to 300 V. For attaining a satisfactory brightness under such conditions, it is necessary that the binder should have a dielectric constant of not less than 7, desirably not less than 10. Generally, however, most substances having a high dielectric constant are hygroscopic.

Since operating life is greatly influenced by moisture content, it is necessary to minimize the moisture content of the binder and at the same time minimize permeability moisture measures taken to decrease moisture content cause a decrease in dielectric constant.

Powder EL elements, in which particulate zinc sulfide is used as the main component of the luminescent material and an epoxy resin as the organic binder, allow good light transmission and show good electric properties but cannot be said to have sufficient moisture resistance. In particular, luminescent particles consisting mainly of zinc sulfide are very sensitive to moisture and can afford provide only a short operating life. To cope with this problem, measures are known which involve sealing with a plastic film for moisture resistance or removing the moisture adsorbed on the raw material luminescent particles as far as possible, but they are not fully satisfactory.

Organic binders made of a cyanothylated material are poor in heat resistance, and cannot be treated at a temperature necessary for thorough drying. As a result, considerable moisture is retained only a short operating life can be attained, as with epoxy resins.

Accordingly, it is an object of the invention to provide a high-brightness, long-life powder EL element by providing an improved organic binder.

SUMMARY OF THE INVENTION

The invention provides a powder EL element which comprises electroluminescent particles and an organic binder at least partly comprising a polyurethane.

BRIEF DESCRIPTION OF THE DRAWINGS

FIG. 2 is a graphical representation of the changes in brightness for EL cells with time.

DETAILED DESCRIPTION OF THE INVENTION

Figure 1:
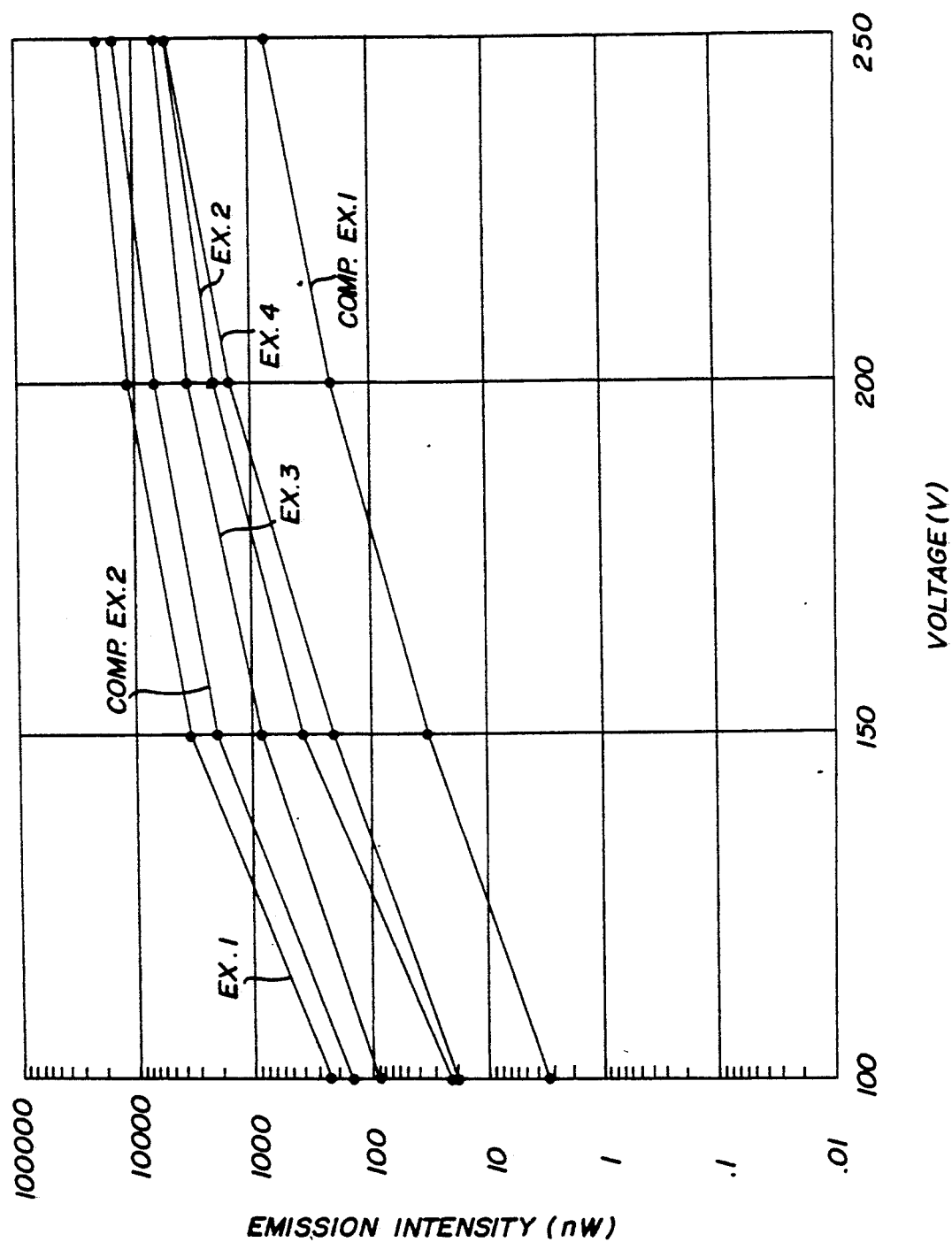
FIG. 1 is a graphical representation of the voltage dependency of the brightness or emission intensity for EL cells.

Usable as the luminescent particles are particles of zinc sulfide, selenium sulfide, zinc sulfide-selenium sulfide (mixed crystal form), calcium sulfide, strontium sulfide, cadmiun sulfide, cadmium selenide, cadmium telluride and the like, with one or two activators, such as copper, silver, gold, zinc, aluminum, manganese, rare earth elements and halogens, added to the base materials as required. Depending on the base material and activator(s) used, the color of light emitted may vary as follows:

| | |
|---|---|
| ZnS (Cu, Al) | Yellowish green; |
| ZnS (Cu, Cl) | Blue; |
| ZnS.ZnSe (Cu, Br) | Green; |
| ZnS (Mn) | Orange; |
| ZnS (Tb) | Green; |
| ZnS (Tm) | Blue. |

The polyurethane can be produced by reacting a polyol with a polyisocyanate. When the raw materials (polyol and polyisocyanate) are properly selected and combined, the polyurethane becomes suitable for use as the dispersion medium from the light transmission, electric properties and moisture resistance viewpoints.

The polyol to be used in polyurethane production includes, among other, polyether polyols, polytetramethylene glycol, tetrahydrofuran-alkylene oxide copolymer polyols, epoxy resin-modified polyols, polyester polyols (condensation product polyester polyols, lactone-derived polyester polyols, polycarbonate polyols), acrylic polyols, polybutadiene polyol, partially saponified ethylene-vinyl acetate copolymer, phosphorus-containing polyols, aromatic amine polyether phenol polyols, ethylene glycol, diethylene glycol, propylene glycol, dipropylene glycol, 1,4-butanediol, neopentyl glycol, 1,6-hexanediol, trimethylolpropane, glycerol, pentaerythritol and castor-oil derived polyol. Among them, polyester polyols, in particular lactone-derived polyester polyols, are of particular importance.

For producing polyurethanes having a high dielectric constant (desirably not less than 7, preferably not less than 10), it is desirable that a compound having a high dielectric constant, for example a cyanoethyl-, halogen- or nitro-containing compound, be admixed with the polyol or that a polyol containing such compound introduced into the molecule thereof be used.

As such compound, there may be mentioned, for example, trichlorobutylene oxide polymer polyol, epichlorohydrin-brominated polyol polymer polyols, brominated pentaerythritol-sucrose polyols, tetrabromophthalic acid-based polyester polyols, 2,3-dibromo-1-propanol, 1,3-dichloro-2-propanol, 4-(trifluoromethyl)-benzyl alcohol, 2,2,2-trifluoroethanol, glycerol α-monochlorohydrin, cyanoethylated sucrose, cyanoethylated glycerol-pullulan condensate, cyanoethylated glycerol-hydroxyethylcellulose condensate, cyanoethylated glycerol-solubile starch condensate, cyanoethylated glycerol-sucrose condensate, cyanoethylated glycerol-polyvinyl alcohol condensate, tris(chloroethyl) phosphate, tris(dichloropropyl) phosphate and 1,2,3-tribromopropane.

As the polyisocyanate, there may be mentioned, among others, tolylene diisocyanate, diphenylmethanediisocyanate, carbodiimide-modified diphenylmethanediisocyanate, hydrogenated diphenylmethanediisocyanate, naphthalenediisocyanate, xylylene diisocyanate, hydrogenated xylylene diisocyanate, tetramethylxylenediisocyanate, toluidinediisocyanate, hexamethylene diisocyanate, isophoronediisocyanate, phenylene diisocyanate, cyclohexane-1,4-diisocyanate, trimethylhexamethylene diisocyanate, 1,6,11-undecanetriisocyanate, lysine ester triisocyanate, 1,3,6-hexamethylenetriisocyanate, bicycloheptanetriisocyanate and the like polyisocyanates, and adducts derived from these polyisocyanates and polyhydric alcohols (e.g. trimethylolpropane). Among them, hexamethylene diisocyanate and prepolymers derived therefrom are of particular importance.

The polyol and polyisocyanate are reacted with each other preferably in an NCO/OH ratio of 0.6–1.7. It is particularly desirable to carry out the reaction under conditions such that the NCO/OH ratio is 1.01–1.7 so as to give a polyurethane containing unreacted NCO groups.

While the invention consists in the use of a polyurethane as the organic binder, it is also possible to use conventional binders, such as epoxy resins, polyimides, fluororesins, cyanoethylation products (e.g. cyanoethylated cellulose, cyanoethylated polyvinyl alcohol, cyanoethylated sucrose), ethylcellulose and acrylic polymers, in combination with the polyurethane.

The luminescent layer is formed by applying a mixture essentially consisting of luminescent particles and an organic binder or binders to a back or front plate (electrode) and then covering the mixture layer with a front or back plate (electrode). In this case, solvents, such as alcohols, ketones, esters, ethers, hydrocarbons, halogen-containing solvents, nitrogen-containing solvents and sufur-containing solvents, may be added, either singly or in admixture, to said mixture.

The back plate may be constructed of a metal plate, sheet or foil electrode as such or of a substrate fitted with an electrode. The substrate may be opaque or transparent. It may be rigid or flexible. It is also possible to form the back plate by vapor phase deposition thereof on the luminescent layer.

The front plate is constructed by forming a substantially transparent electroconductive layer of indium oxide, tin oxide or the like on one side of a plate or sheet of glass, plastic or the like material. The transparent electrode may cover the luminescent layer entirely or in a patternlike manner, for example in a manner indicative of a letter or letters or a figure or figures.

It is possible to modify the construction mentioned above by, for example, additionally forming a subtantially transparent dielectric layer (e.g. of barium titanate, lead titanate, strontium titanate, titanium oxide, samarium oxide, PLZT, yttrium oxide, tantalum pentoxide, silicon nitride) between the back plate and the luminescent layer and/or between the front plate and the luminescent layer, or disposing a substantially transparent dielectric layer on the luminescent layer and then forming the back plate thereon by vapor phase deposition or some other appropriate method.

EL devices in which the powder EL element according to the invention is used can be used in various fields of application, for example in displays of computers and word processors, announcement or information boards, airfield displays, backlights for gauge panels and the like, ordinary illuminators, signboards, advertising boards, decorations or ornaments, toys, displays of portable apparatus or instruments, and television screens.

The powder EL devices provided by the invention, when a voltage is applied thereto, emit light from the luminescent layer, and the light exits from the front plate side. When the back plate is constructed of a substantially transparent material as well, the light emitted from the luminescent layer can be exits also from the back plate side.

In the powder EL element according to the invention, a polyurethane, in particular a polyurethane containing NCO groups, is used as at least part of the organic binder. Thus, the luminescent layer has a very low level of hygroscopicity and, at the same time, those water molecules originally adsorbed on the luminescent particle surface can be removed as a result of reaction thereof with the NCO groups. Even when moisture invades the element from the outside, the moisture is rapidly removed by the reaction mentioned above. As a result, the operating life of the EL devices in which the element is used is markedly prolonged. In cases where the polyurethane is used in combination with another binder and the latter is hygroscopic, the NCO groups contribute to complete moisture removal, so that the possible reduction in operating life, which has been a serious problem in the prior art, can be inhibited effectively.

A practical level of brightness can be obtained at a relatively low voltage when a polyurethane having a high dielectric constant is selected from among various polyurethane species.

EXAMPLES

The following examples are further illustrative of the present invention. In the following, "part(s)" and "%" are on the weight basis.

ORGANIC BINDERS

Example 1

The urethane formation reaction was carried out in the conventional manner using 75 parts of a lactone-derived polyester polyol ("Placcel® P-308", manufactured by Daicel Chemical Industries, Ltd.; number of functional groups=3; molecular weight=860; OH value=190-200; acid value=not more than 1.0; viscosity=140-160 mPas/75° C.), 25 parts of cyanoethylated sucrose (manufactured by Eastman Kodak Co.), 30.4 parts of hexamethylene diisocyanate and 0.005% (relative to the reaction system) of dibutyltin dilaurate (NCO/OH ratio=1.25).

The polyurethane obtained had a dielectric constant $\epsilon$ of 15.2 as measured at 1 kHz.

Example 2

The polyurethane formation reaction was carried out in the conventional manner using 100 parts of the same lactone-derived polyester polyol as used in Example 1, 10 parts of 1,2,3-tribromopropane, 30.8 parts of hexamethylene diisocyanate and 0.005% (relative to the reaction system) of dibutyltin dilaurate (NCO/OH ratio=1.05).

The polyurethane obtained had a dielectric constant $\epsilon$ of 11.4 as measured at 1 kHz.

Example 3

The polyurethane formation reaction was carried out in the conventional manner using the same lactone-derived polyester polyol as used in Example 1 and hexamethylene diisocyanate prepolymer in an NCO/OH ratio of 1.05 in the presence of 0.005% (relative to the reaction system) of dibutyltin dilaurate.

The polyurethane obtained had a dielectric constant $\epsilon$ of 9.0 as measured at 1 kHz.

Example 4

The polyurethane formation reaction was carried out in the conventional manner using the same lactone-derived polyester polyol as used in Example 1 and hexamethylene diisocyanate in an NCO/OH ratio of 1.05 in the presence of 0.005% (relative to the reaction system) of dibutyltin dilaurate.

The polyurethane obtained had a dielectric constant $\epsilon$ of 10.5 as determined at 1 kHz.

Example 5

The polyurethane formation reaction was carried out in the conventional manner using 75 parts of the same lactone-derived polyester polyol as used in Example 1, 25 parts of cyanoethylated sucrose, 34.1 parts of hexamethylene diisocyanate and 0.005% (relative to the reaction system) of dibutyltin dilaurate (NCO/OH ratio=1.40).

The polyurethane obtained had a dielectric constant $\epsilon$ of 16.3 as determined at 1 kHz.

Example 6

The polyurethane formation reaction was carried out in the conventional manner using 100 parts of the same lactone-derived polyester polyol as used in Example 1, 10 parts of cyanoethylated sucrose, 24.3 parts of hexamethylene diisocyanate and 0.005% (relative to the reaction system) of dibutyltin dilaurate (NCO/OH ratio=0.80).

The polyurethane obtained had a dielectric constant $\epsilon$ of 12.2 as determined at 1 kHz.

Example 7

The polyurethane formation reaction was carried out in the conventional manner using 100 parts of the same lactone-derived polyester polyol as used in Example 1, 10 parts of cyanoethylated sucrose, 30.3 parts of hexamethylene diisocyanate and 0.005% (relative to the reaction system) of dibutyltin dilaurate (NCO/OH ratio=1.00).

The polyurethane obtained had a dielectric constant $\epsilon$ of 11.9 as determined at 1 kHz.

Example 8

The polyurethane formation reaction was carried out in the conventional manner using 90 parts of the same lactone-derived polyester polyol as used in Example 1, 10 parts of 1,3-dichloro-2-propanol, 34.6 parts of hexamethylene diisocyanate and 0.005% (relative to the reaction system) of dibutyltin dilaurate (NCO/OH ratio=1.05).

The polyurethane obtained had a dielectric constant $\epsilon$ of 11.3 as determined at 1 kHz.

Example 9

The polyurethane formation reaction was carried out in the conventional manner using 100 parts of the same lacrone-derived polyester polyol, 10 parts of 4-(trifluoromethyl)benzyl alcohol, 35.8 parts of hexamethylene diisocyanate and 0.005% (relative to the reaction system) of dibutyltin dilaurate (NCO/OH ratio=1.05).

The polyurethane obtained had a dielectric constant $\epsilon$ of 10.1 as determined at 1 kHz.

Example 10

The polyurethane formation reaction was carried out in the conventional manner using 100 parts of the same lactone-derived polyester polyol as used in Example 1, 10 parts of 2,2,2-trifluoroethanol, 39.6 parts of hexamethylene diisocyanate and 0.005% (relative to the reaction system) of dibutyltin dilaurate (NCO/OH ratio=1.05).

The polyurethane obtained had a dielectric constant $\epsilon$ of 11.0 as determined at 1 kHz.

Example 11

The polyurethane formation reaction was carried out in the conventional manner using 100 parts of castor oil, 20 parts of tricresyl phosphate, 44.9 parts of liquefied MDI (carbodiimide-modified diphenylmethanediisocyanate) and 0.005% (relative to the reaction system) of dibutyltin dilaurate (NCO/OH ratio=1.05).

The polyurethane obtained had a dielectric constant $\epsilon$ of 9.0 as determined at 1 kHz.

Comparative Example 1

A mixture was prepared which was composed of 70 parts of an epoxy resin (Epomic® R-140; manufactured by Mitsui Petrochemical Industries, Ltd.) and 30 parts of an amide-type curing agent (Versamid® 125; manufactured by Henkel-Hakusui Kabushiki Kaisha). The mixture had a dielectric constant $\epsilon$ of 3.5 as determined at 1 kHz.

Comparative Example 2

Cyanoethylated sucrose (manufactured by Eastman Kodak Co.) was used. It had a dielectric constant $\epsilon$ of 34.0 as determined at 1 kHz.

POWDER EL ELEMENTS

ZnS (Cu, Cl) particles (Sylvania's grade No. 723) were used as the fluorescent particles.

The organic binders produced in Examples 1-4 and Comparative Examples 1 and 2 were used each as the organic binder.

A 100-$\mu$m-thick polyester film strip to serve as a spacer was placed on the periphery of an aluminum electrode formed on one side of a glass sheet. A mixture of 50 parts of the above-mentioned luminescent particles and 50 parts of one of the organic binders were applied to the spacer-surrounded electrode surface. Then, a 1-mm-thick glass sheet having a transparent indium oxide electrode formed thereon was brought into close contact with the luminescent layer formed in the above manner, with the transparent electrode surface facing the luminescent layer. The EL cell thus formed was sealed up by applying an epoxy resin to the circumference of the cell.

A sine-wave power source and a rectangular wave power source were used for exciting the EL element. The dependency of the brightness or light emission intensity of the EL cell on the voltage was evaluated using an Anritsu model ML 94A light power meter. For investigating the changes in brightness with time, a Hamamatsu Photonics model S1336-5BK photodiode was used.

EVALUATION

The results of measurements made for evaluating the voltage dependency of the brightness (emission intensity) of each EL cell in which one of the organic binders prepared in Examples 1-4 and Comparative Examples 1 and 2 was used are graphically shown in FIG. 1.

As is evident from FIG. 1, the organic binders may be arranged in the order of brightness as follows: Example 1>Comparative Example 2>Example 3>Example 2>Example 4>Comparative Example 1. The EL cells produced by using the polyurethanes as the organic binders were all superior in brightness to the cell constructed by using the Epomic epoxy resin of Comparative Example 1. In addition, the cell of Comparative Example 2 where cyanoethylated sucrose was used was excellent in brightness.

The changes in brightness (light emission intensity) as found with the EL cells produced by using the organic binders of Example 1 and Comparative Examples 1 and 2 are graphically shown in FIG. 2.

FIG. 2 indicates that the cell produced by using the epoxy resin of Comparative Example 1 was poor in brightness even in the initial stage.

As regards the cell prepared by using cyanoethylated sucrose (Comparative Example 2), the initial brightness was relatively high but the cell underwent significant deterioration with time, so that the brightness decreased in about 25 hours to a level nearly equal to or rather lower than the brightness of the cell prepared by using the epoxy resin of Comparative Example 1 as the organic binder. This is presumably due to deterioration of the fluorescent substance caused by moisture contained therein.

In the examples where the respective polyurethanes were used, the changes with time were generally small. While the use of cyanoethylated sucrose alone resulted in great changes with time, the polyurethane produced by using cyanoethylated sucrose as part of the polyol component did not cause large changes with time, as illustrated in FIG. 2. This is supposedly due to the ability of the polyurethane to prevent moisture from invading into the luminescent layer from the outside and to the ability of the remaining NCO groups to react with moisture contained in luminescent particles and/or cyanoethylated sucrose and thus thoroughly eliminate moisture from the electroluminescent system.

In a further example where a polyurethane prepared by using cyanoethylated sucrose alone as the polyol was used as the binder, similar good results were obtained.

What is claimed is;

1. A powder electroluminescent element comprising inorganic electroluminescent particles and an organic binder having a dielectric constant of not less than 7 at 1 kHz, said organic binder comprising a polyurethane having admixed therewith a cyanoethyl-, halogen- or nitro-containing compound having a dielectric constant of not less than 7 at 1 kHz.

2. A powder electroluminescent element comprising inorganic electroluminescent particles and an organic binder comprising a polyurethane having a dielectric constant of not less than 7 at 1 kHz, wherein the polyurethane comprises a cyanoethyl-, halogen- or nitro-containing polyol component.

* * * * *